Patented Dec. 28, 1926.

1,612,649

UNITED STATES PATENT OFFICE.

THOMAS C. POND, OF WAUKEGAN, ILLINOIS, ASSIGNOR TO JOHNS-MANVILLE INCORPORATED, OF NEW YORK, N. Y., A CORPORATION OF NEW YORK.

BRICKMAKING.

No Drawing.    Application filed February 25, 1926. Serial No. 90,687.

My invention relates to brickmaking, particularly to the manufacture of refractory silica bricks and analogous shapes, intended and adapted for use in situations where heat insulation under high temperature conditions, is demanded. Among the objects to which the invention is addressed may be mentioned compensation for variations in quality and characteristics of raw silicious material as those are obtained from various available natural sources, the utilization of silicious material heretofore inadequate to the production of refractory insulating brick of good and efficient quality, and a fairly wide range of quality in the end-product, with respect to weight per unit volume, heat insulating value, and physical strength.

The basic material for making brick of the character designated is diatomaceous earth, which in all instances which have come to my knowledge consists of silica in predominant proportions, together with small proportions of alkaline earths, for instance aluminum salts and calcium salts. Certain exceptional natural deposits of diatomaceous earth are of much lighter weight per unit volume than that of the great majority of deposits; this exceptional quality is attributed to the unbroken condition of the microscopic diatom skeletons or shells, which thus provide a cellular or open structure, conducting both to light weight and to high heat insulating quality. It has been proposed to compensate for the greater density of diatomaceous earth obtainable from the majority of deposits by mixing with it comminuted organic material, such as sawdust, sponge, wood pulp, which when a molded brick shape has burned in the kiln, was consumed, leaving small voids distributed through the finished brick. The voids themselves, thus produced, contain some ash, which detracts from the value of the product by occupying the voids to a greater or less extent, and adding to the weight of the brick. Also, in so far as the ash residue from organic material contains salts, as of sodium or potassium, it tends to clog or fill the intended voids in the brick by formation of glass in association with the silica of diatomaceous earth, which while possibly serving to frit the silica material does so to some extent to the detriment of desired qualities.

My invention is characterized by the mixture with diatomaceous earth (which may be of any original quality) of comminuted, normally solid inorganic material, acid in character and therefore in itself unreactive with silica, unaffected by water, which practically must be used in tempering the diatomaceous earth for molding into shapes such as brick, completely destructible, or rather eliminable, at temperatures within the usual range employed for firing such brick, and recoverable either by formation of commercial by-product, or in its original condition. The inorganic material which not only contributes all these desired characteristics, but also, as I infer from observation of its effects, promotes and ensures reactions between the distributed small proportions of alkaline earths in the diatomaceous earth and the silica particles which for the most part compose it, thus promoting the fritting action of these earths, is sulfur.

Specifically, and by way of example to illustrate my invention, take any of the heavier, denser diatomaceous earths, such as is mined at Terreboone, Oregon, which comprise about 95% silica and 5% alkaline earths (alumina and lime) and make a mixture of this with finely granulated or powdered sulfur in proportions, by weight, 85% diatomaceous earth, 15% sulfur.

For tempering, moisten the mixture of sulfur and diatomaceous earth with about its own weight of water, mold the moist material in brick molds under a pressure of about 250 pounds to the square inch.

Dry the moist brick shapes in a hot air drier for 24 to 30 hours, at a temperature from 250° to 300° Fahrenheit. Then fire the dried brick in a kiln—a tunnel kiln by preference—at the rate of about 100° F. per hour, up to 2000° F., preferably under conditions which prevent hot flame gases from impinging on the brick, especially during earlier stages of the firing. After 2000° F. is reached, allow the brick to soak in that temperature for four or five-hours, and then lower the temperature at the rate of about 100° F. per hour until 200° F. is reached, when the brick may be removed from the kiln. The product made as above specified will weigh from 28 to 45 pounds per cubic foot, according to the weight and density of the raw earth-material; bricks $4\frac{1}{2} \times 2\frac{1}{4} \times 9$ inches, broken transversely on eight inch centers will break at an average of about 300 pounds. The brick thus made shows a shrinkage in the kiln of about 22% on its original bulk. Its heat insulating value is high, comparing favorably with brick made of the exceptionally light diatomaceous earth deposits by cutting blocks from the quarried material itself.

The sulfur incorporated with diatomaceous earth forms voids in the completed product; thus the weight per unit volume of the finished brick depends in part on the percentage of sulfur used in the preliminary mixture. If upon test a supply of diatomaceous earth is found to be denser than the material which may be arbitrarily adopted as a standard to use in the 85% to 15% diatomaceous earth—sulfur ratio—the proportion of sulfur may be appropriately increased so that the end product will have the standard weight per cubic foot. Increase of the sulfur proportion will to some extent diminish the resistance to breaking stresses, but the variations in ingredient-percentages required to compensate for variations in density of diatomaceous earth will not cause any serious fluctuations in the strength (or in the heat-insulating capacity) of the fired brick.

Sulfur, being acid in character, does not react with silica, which is also acid in character; thus the chemical reactions in the material during firing are restricted to the formation of such compounds as aluminum and calcium silicates, by local reaction between silica and the small-proportion of alkaline earth present in the raw material. The formation of these compounds, which are essentially glazes, at innumerable loci in the body of the brick, frits the silica particles together, and contributes largely to the mechanical strength of the final product.

This fritting of the silica particles, as evidenced by the uniform mechanical strength of the finished brick is complete and effective, utilizing all the fluxing substances which are present and distributed through the diatomaceous earth. I attribute this to reaction by sulfur and sulfur dioxid upon the calcium and aluminum salts in the mass, and the consequent production and temporary existence of sulfides or sulfites which promote the formation of compound salts of aluminum and silicon, and probably also calcium and silicon, in other words assist in the local fluxing of small quantities of the silica. So far as I have been able to ascertain from examination and analysis of the finished brick, their substance contains no trace of sulfur.

While I believe that sulfur is the best material commercially available for the purposes above set forth, I wish it to be regarded as representative of substances which functionally and in their physical characteristics are substantially equivalent to sulfur in the material associations and in the circumstances of process in which my invention is realized. The qualities, possessed by sulfur, which render a material ingredient of silica-brick material effective to perform the functions and accomplish the results above described, and by which, in whole or in part, equivalents for sulfur may be selected or recognized, are as follows:

1. Solidity under the pressure required to form a brick-shape and at temperatures as high as those required for drying a brick-shape. This quality enables sulfur particles to occupy and define the spaces in a mass of the brick-composition which eventually are to constitute voids in the completed product.

2. Physical and chemical indifference to water. This quality enables the sulfur particles to preserve their shape and spatial proportions when the brick material is moistened to give it initial consistency.

3. Capability of complete elimination from the brick-shape by assuming gaseous phase under the temperature conditions incidental to firing and fritting the composite material. This quality of sulfur particles is functional to produce voids in the finished brick product free from any residue or deposit, such as ash. It will be noted that the oxidation products of sulfur are gaseous and therefore are eliminated, or if they remain in small proportion do not detract from heat insulating efficiency or add to the weight of the brick.

4. Chemical indifference to silica. This quality represented by the acid characteristic of sulfur ensures the predominant brick material — silica — against any chemical change for which the introduced particles might be directly responsible, and restricts the alteration of the silica to those incidental and beneficial local fluxing reactions which are due primarily to the presence of such salts as lime and alumina. It also— as is believed—promotes the formation of fluxes by reaction on the alkaline earths which occur in diatomaceous earth.

While comminuted sulfur or its equivalent in functional relationship and performance, as an ingredient in a silica brick composition, is believed to have special value in association with the denser grades of diatomaceous earth, it may be employed with the lighter and more perfectly open-structured or cellular grades, if it be desired to produce from the latter material a brick lighter in weight than is obtainable by the use of said natural material alone. Sulfur is further advantageous, in that it lends itself to recovery in the form of by-products such as sulfuric acid, obtainable by well known treatment of sulfur dioxid, or as precipitated sulfur if its gaseous phase comprises sublimated sulfur.

I claim:

1. Silica brick material, comprising a mixture of diatomaceous earth with comminuted inorganic material possessing the characteristics of solidity at normal atmospheric temperatures and capability of complete conversion to gaseous phase under brick-firing temperatures.

2. Silica brick material, comprising a mixture of diatomaceous earth with comminuted inorganic material possessing the characteristics of solidity at normal atmospheric temperatures, physical and chemical indifference to water, and capability of complete conversion to gaseous phase under brick-firing temperatures.

3. Silica brick material, comprising a mixture of diatomaceous earth with comminuted inorganic material possessing the characteristics of solidity at temperatures to and including those required for drying a moist brick-shape, and capability of complete conversion to gaseous phase under brick-firing temperatures.

4. Silica brick material, comprising a mixture of diatomaceous earth with comminuted inorganic material possessing the characteristics of solidity at temperatures to and including those required for drying a moist brick-shape, physical and chemical indifference to water, and capability of complete conversion to gaseous phase under brick-firing temperatures.

5. Silica brick material, comprising a mixture of diatomaceous earth with comminuted inorganic material possessing the characteristics of solidity at normal atmospheric temperatures, chemical indifference to silica, and capability of complete conversion to gaseous phase at brick-firing temperatures.

6. Silica brick material, comprising a mixture of diatomaceous earth with comminuted inorganic material possessing the characteristics of solidity at temperatures to and including those required for drying a moist brick-shape, chemical indifference to silica, and capability of complete conversion to gaseous phase at brick-firing temperatures.

7. Silica brick material, comprising a mixture of diatomaceous earth and comminuted sulfur.

8. Method of making silica brick, comprising as steps mixing with diatomaceous earth a comminuted inorganic material solid at normal atmospheric temperatures and capable of complete conversion to gaseous phase at brick-firing temperatures, molding said mixture, drying and firing the same.

9. Method of making silica brick, comprising as steps mixing comminuted sulfur with diatomaceous earth, molding said mixture, drying the same, then firing, with conversion of sulfur to gaseous phase and concomitant fluxing and fritting of the silica particles with alkaline earths associated therewith.

10. Silica brick material, comprising a mixture of diatomaceous earth with comminuted inorganic material possessing the characteristics of solidity at normal atmospheric temperatures and capable of conversion by volatilization under brick-firing temperatures.

11. Silica brick material, comprising a mixture of diatomaceous earth with comminuted inorganic material possessing the characteristics of solidity at normal atmospheric temperatures, physical and chemical indifference to water, and capability of conversion by volatilization under brick-firing temperatures.

12. Silica brick material, comprising a mixture of diatomaceous earth with comminuted inorganic material possessing the characteristics of solidity at temperatures to and including those required for drying a moist brick-shape, and capability of conversion by volatilization under brick-firing temperatures.

13. Silica brick material, comprising a mixture of diatomaceous earth with comminuted inorganic material possessing the characteristics of solidity at temperatures to and including those required for drying a moist brick-shape, physical and chemical indifference to water, and capability of conversion by volatilization under brick-firing temperatures.

14. Silica brick material, comprising a mixture of diatomaceous earth with comminuted inorganic material possessing the characteristics of solidity at normal atmospheric temperatures, chemical indifference to silica, and capability of conversion by volatilization at brick-firing temperatures.

15. Silica brick material, comprising a mixture of diatomaceous earth with comminuted inorganic material possessing the characteristics of solidity at temperatures to and including those required for drying a moist brick-shape, chemical indifference to silica, and capability of conversion by volatilization at brick-firing temperatures.

16. Silica brick material, comprising a mixture of diatomaceous earth with comminuted inorganic material acid in character, possessing the characteristics of solidity at normal atmospheric temperatures and capability of complete conversion to gaseous phase under brick-firing temperatures.

17. Silica brick material, comprising a mixture of diatomaceous earth with comminuted inorganic material acid in character, possessing the characteristics of solidity at normal atmospheric temperatures, physical and chemical indifference to water, and capability of complete conversion to gaseous phase under brick-firing temperatures.

18. Silica brick material, comprising a mixture of diatomaceous earth with comminuted inorganic material acid in character, possessing the characteristics of solidity at temperatures to and including those required for drying a moist brick-shape, and capability of complete conversion to gaseous phase under brick-firing temperatures.

19. Silica brick material, comprising a mixture of diatomaceous earth with comminuted inorganic material acid in character possessing the characteristics of solidity at temperatures to and including those required for drying a moist brick-shape, physical and chemical indifference to water, and capability of complete conversion to gaseous phase under brick-firing temperatures.

20. Silica brick material, comprising a mixture of diatomaceous earth with comminuted inorganic material acid in character, possessing the characteristics of solidity at normal atmospheric temperatures, chemical indifference to silica, and capability of complete conversion to gaseous phase at brick-firing temperatures.

21. Silica brick material, comprising a mixture of diatomaceous earth with comminuted inorganic material acid in character, possessing the characteristics of solidity at temperatures to and including those required for drying a moist brick-shape, chemical indifference to silica, and capability of complete conversion to gaseous phase at brick-firing temperatures.

Signed by me at Cincinnati, Ohio, this 15th day of February 1926.

THOMAS C. POND.